US011962106B2

(12) United States Patent
Shiga

(10) Patent No.: US 11,962,106 B2
(45) Date of Patent: Apr. 16, 2024

(54) CONNECTOR

(71) Applicant: TYCO ELECTRONICS JAPAN G.K., Kawasaki (JP)

(72) Inventor: Katsumi Shiga, Kawasaki (JP)

(73) Assignee: TYCO ELECTRONICS JAPAN G.K., Kawaski (JP)

( * ) Notice: Subject to any disclaimer, the term of this patent is extended or adjusted under 35 U.S.C. 154(b) by 314 days.

(21) Appl. No.: 17/626,938

(22) PCT Filed: Jul. 8, 2020

(86) PCT No.: PCT/JP2020/026754
§ 371 (c)(1),
(2) Date: Jan. 13, 2022

(87) PCT Pub. No.: WO2021/010262
PCT Pub. Date: Jan. 21, 2021

(65) Prior Publication Data

US 2022/0263263 A1 Aug. 18, 2022

(30) Foreign Application Priority Data

Jul. 18, 2019 (JP) ................................ 2019-132385

(51) Int. Cl.
*H01R 13/641* (2006.01)
*H01R 13/426* (2006.01)

(52) U.S. Cl.
CPC .................................. *H01R 13/426* (2013.01)

(58) Field of Classification Search
CPC ............................ H01R 13/426; H01R 13/641
See application file for complete search history.

(56) References Cited

U.S. PATENT DOCUMENTS 4,634,204 A * 1/1987 Detter .................. H01R 13/641 439/352
5,120,255 A * 6/1992 Kouda ................. H01R 13/641 439/489

(Continued)

FOREIGN PATENT DOCUMENTS

DE 202017105774 U1 1/2019
EP 3120422 B1 7/2019

(Continued)

OTHER PUBLICATIONS

Extended European Search Report for corresponding EP Application No. 20840264.4 dated Jul. 3, 2023 (8 pages).

(Continued)

*Primary Examiner* — Neil Abrams

(57) ABSTRACT

A connector 10 includes a housing 20 and a CPA 30. The CPA 30 includes a basal portion 60, a pair of right and left first elastic arms 71, and a second elastic arm 75. Each of the first elastic arms 71 includes a first arm portion 72, a second arm portion 73, and a catch protrusion 74. The second elastic arm 75 similarly includes a third arm portion 76, a fourth arm portion 77, and a protruding portion 78. In this way, the first elastic arms 71 and the second elastic arm 75 are shaped to extend from the basal portion 60, be folded back, and return to the basal portion 60. Thus achieved are a CPA 30 and a connector 10 that are short in length while ensuring sufficient flexibility of the first elastic arms 71 and the second elastic arm 75 when the catch protrusion 74 and the protruding portion 78 interfere with the housing 20. The connector including the CPA has a reduced length in a sliding direction while keeping elastic arms sufficiently flexible.

3 Claims, 6 Drawing Sheets

(56) References Cited

U.S. PATENT DOCUMENTS

| | | | | |
|---|---|---|---|---|
| 5,803,651 | A * | 9/1998 | Saito | H01R 13/641 439/352 |
| 5,928,038 | A * | 7/1999 | Berg | H01R 13/6272 439/752 |
| 6,824,417 | B1 * | 11/2004 | Nimura | H01R 13/641 439/352 |
| 6,857,892 | B2 * | 2/2005 | McLauchlan | H01R 13/6272 439/352 |
| 8,016,606 | B1 * | 9/2011 | Kwan | H01R 13/641 439/352 |
| 8,616,914 | B2 * | 12/2013 | Mumper | H01R 13/6272 439/489 |
| 9,608,373 | B2 * | 3/2017 | Wu | H01R 13/6272 |
| 9,893,464 | B2 * | 2/2018 | Endo | H01R 13/639 |
| 10,116,091 | B2 * | 10/2018 | Salgado | H01R 13/62927 |
| 10,135,172 | B1 * | 11/2018 | Foltz | H01R 13/641 |
| 10,749,295 | B2 * | 8/2020 | Mayer | H01R 13/641 |
| 10,811,820 | B2 * | 10/2020 | Ohfuku | H01R 13/641 |
| 11,245,228 | B2 * | 2/2022 | Takeuchi | H01R 13/506 |
| 11,276,960 | B2 * | 3/2022 | Colarusso | H01R 13/506 |
| 11,387,604 | B2 * | 7/2022 | Margrave | H01R 13/6275 |
| 11,456,553 | B2 * | 9/2022 | Soh | H01R 43/20 |
| 11,539,168 | B2 * | 12/2022 | Shiga | H01R 13/6272 |
| 2015/0147901 | A1 | 5/2015 | Wu et al. | |
| 2022/0263263 | A1 * | 8/2022 | Shiga | H01R 13/641 |
| 2022/0263270 | A1 * | 8/2022 | Shiga | H01R 13/6272 |

FOREIGN PATENT DOCUMENTS

| | | | |
|---|---|---|---|
| EP | 3742560 | A1 | 11/2020 |
| JP | 2004-327321 | A | 11/2004 |
| JP | 2017-508257 | A | 3/2017 |
| JP | 2017152272 | A | 8/2017 |

OTHER PUBLICATIONS

International Search Report and Written Opinion for corresponding PCT/JP2020/026754 dated Sep. 15, 2020 (2 pages).

* cited by examiner

CONNECTOR

CROSS REFERENCE TO RELATED APPLICATIONS

This application claims priority to and is a 3.71 International Application of PCT/JP2020/26754 filed 8 Jul. 2020 (Published as WO2021010262, published 21 Jan. 2021), the subject matter of which is herein incorporated by reference in its entirety.

BACKGROUND OF THE INVENTION

The subject matter herein relates generally to electrical connectors.

There has conventionally been known a connector including a connector position assurance device (CPA, Connector Position Assurance) configured to assure a state of being completely mated with a mating connector (see, for example, Japanese Patent JP2017-152272 (PTL1)). The CPA slides in a direction of mating with a mating connector on a sliding surface formed on a connector housing. Moreover, the CPA can slide into a particular position only in a state of being completely mated with the mating connector. Thus, it is assured by the CPA being in a state of having slid into the particular position that the CPA is completely mated with the mating connector.

In the case of the connector disclosed in PTL 1, the CPA is provided with elastic arms in the form of a both-end-fixed beam supported both forward and backward in the direction of a slide into a catch onto the housing. Each of these elastic arms has a protruding portion formed thereon. Moreover, the elastic arms are warped once by causing the protruding portions to interfere with the housing as the CPA slides. In this structure, the protruding portions catch the housing once a further slide causes the elastic arms to return to their original shapes.

The elastic arms need to sufficiently flexibly warp without being too hard when the protruding portions have interfered with the housing. For this purpose, the elastic arms need certain lengths. If these lengths are too short, the elastic arms are too hard to warp when the protruding portions have interfered with the housing, and may become damaged. This may make it necessary to increase the length of the CPA in order to keep these elastic arms easy to warp.

There is a need for a connector including a CPA having a reduced length in a sliding direction while keeping elastic arms sufficiently flexible.

BRIEF DESCRIPTION OF THE INVENTION

In one embodiment, a connector is provided configured to attain the foregoing object that includes a housing having a mating portion configured to be mated with a mating connector and a connector position assurance device configured to slide between a first position on the housing and a second position further in front of the mating portion than the first position and, by being in the second position, assure that the connector position assurance device is in a state of being completely mated with the mating connector. The connector position assurance device includes a basal portion and first elastic arms, located on both sides of the connector position assurance device in a width direction intersecting a sliding direction of the connector position assurance device, each of which includes a first arm portion that is connected to the basal portion and that extends from the basal portion toward the mating portion, a second arm portion that is folded back at a leading end of the first arm portion, that extends toward the basal portion, and that is connected to the basal portion, and a first device-side catch portion that protrudes outward in the width direction, and the housing includes a first housing-side catch portion configured to catch the first device-side catch portion. A connector including a CPA having a reduced length in a sliding direction while keeping elastic arms sufficiently flexible is achieved.

Optionally, each of the first elastic arms of the CPA constituting the connector has a first arm portion extending from a basal portion and a second arm portion folded back to the basal portion. This makes it possible to reduce a length in a sliding direction while ensuring flexibility against warpage by ensuring the length of the first elastic arm.

Optionally, the second arm portion may be folded back at the leading end of the first arm portion so as to be located above or below the first arm portion.

In an embodiment, in order to reduce the length in the sliding direction, the second arm portion may be folded back so as to be put lateral to the first arm. Note, however, that in this case, the resulting CPA is great in width. On the other hand, when the second arm portion is folded back so as to be located above or below the first arm portion, the width of the CPA is narrower than in a case where the second arm portion is folded back so as to be put lateral to the first arm.

Further, in an embodiment, the connector may include a second elastic arm including a third arm portion that is connected to the basal portion and that extends from the basal portion toward the mating portion, a fourth arm portion that is folded back upward at a leading end of the third arm portion, that extends toward the basal portion, and that is connected to the basal portion, and a second device-side catch portion that protrudes upward from the fourth arm portion, and that the housing includes a second housing-side catch portion configured to catch the second device-side catch portion. By including the second elastic arm and the second housing-side catch portion, a connector having a catch structure in an upper part of the CPA while having a reduced length in the sliding direction is achieved.

DETAILED DESCRIPTION OF THE INVENTION

Figure 1:
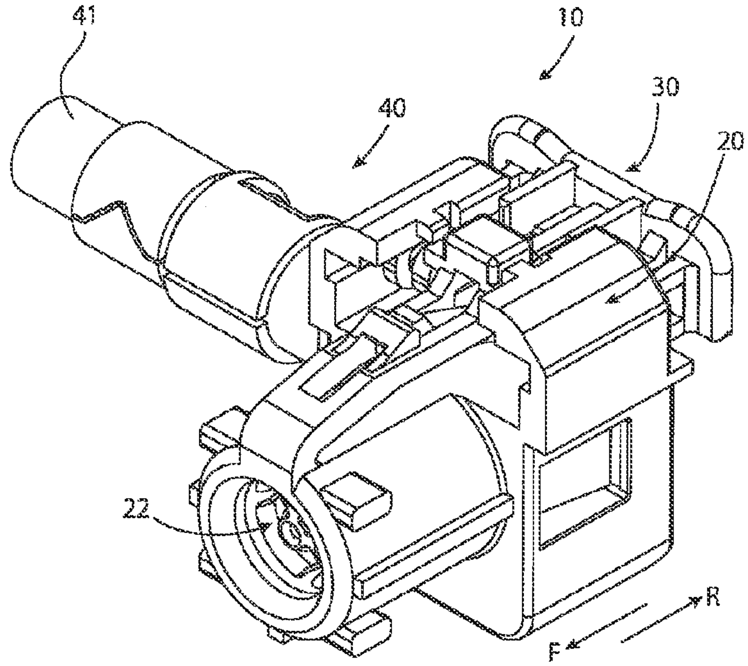
FIG. 1 is an isometric view of a connector in accordance with an exemplary embodiment.
Figure 2:
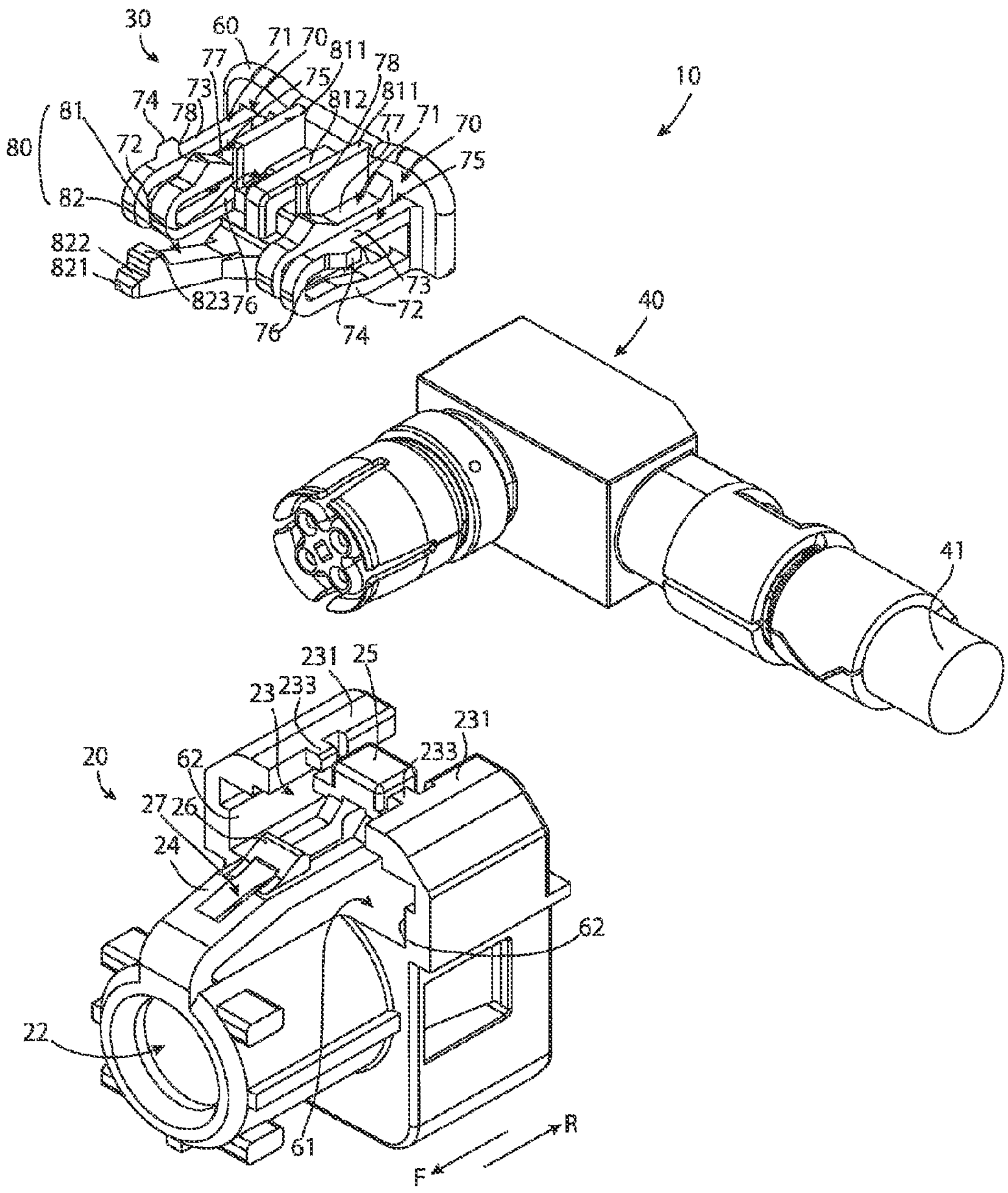
FIG. 2 is an exploded isometric view of the connector shown in FIG. 1.

FIG. 1 is an isometric view of a connector 10 in accordance with an exemplary embodiment. FIG. 2 is an exploded isometric view of the connector 10. The connector 10 includes a housing 20, a CPA 30, and a terminal module 40. A cable 41 is connected to the terminal module 40. In this example, only a portion of the cable 41 near the terminal module 40 is illustrated, although the cable 41 is further elongated in actuality. Further, the terminal module 40 is fitted into the housing 20 in an orientation shown in FIG. 1, although the terminal module 40 is shown in inverted orientation in FIG. 2.

A mating opening 22 into which a part of a mating connector 50 (see FIG. 6) is plugged at the time of mating with the mating connector 50 is provided at a front end of the housing 20 in a direction indicated by an arrow F. The terminal module 40 has a female contact 42 (see (C) of FIG. 4 and (C) of FIG. 5) inside the housing 20. The mating connector 50 includes a male contact (not illustrated) configured to combine with the female contact. When the mating connector 50 is mated, the male contact of the mating connector 50 fits into the female contact of the connector 10, so that the contacts become electrically connected.

A CPA retaining portion 23 configured to retain the CPA 30 is provided in an upper part of the housing 20.

The CPA 30 is plugged into the CPA retaining portion 23 from behind the housing 20 and retained in the CPA retaining portion 23. Once retained in the CPA retaining portion 23, the CPA 30 is placed in an unmated position (see FIG. 4). FIG. 1 shows the CPA 30 in this unmated position. Moreover, at the time of mating with the mating connector 50, the CPA 30 slides into a completely mated position (see FIG. 5) in the direction of the arrow F as will be mentioned later. The unmated position is equivalent to an example of a first position, and the completely mated position is equivalent to an example of a second position.

The CPA retaining portion 23 has a sliding surface 61 on which the CPA 30 is mounted and side walls 62 standing on the right and left sides of the sliding surface 61 to guide the CPA into a slide. As shown in (A) of FIG. 4 and (A) of FIG. 5, a catch projecting portion 63 projecting inward is provided at a rear end portion (leading end portion in the direction of an arrow R) of each of the side walls 62. The catch projecting portion 63 is equivalent to an example of a first housing-side catch portion.

Further, the CPA retaining portion 23 is provided with a gate portion 231 placed at a space from the sliding surface 61 and located over the sliding surface 61 from the right and left sides. The gate portion 231 is provided with a dropping portion 232 (see (C) of FIG. 4 and (C) of FIG. 5) protruding downward. The dropping portion 232 is equivalent to an example of a second housing-side catch portion. It should be noted that a protruding portion 233 protruding inward from the gate portion 231 comes into contact with an operating portion 25 of a lock arm 24 and functions as a stopper that prevents the lock arm 24 from being excessively displaced or damaged.

Furthermore, the housing 20 has the lock arm 24, whose front end is fixed and that extends backward in the form of a cantilever beam. Moreover, at a backward free end of the lock arm 24, the operating portion 25, which is operated in disconnecting the connector 10 from the mating connector 50, is provided. Furthermore, a lock portion 26 is provided at a midpoint of the backward extension of the lock arm 24. Moreover, furthermore, the lock arm 24 has a long hole 2724 formed therein. The long hole 27 extends from a position further forward than the lock portion 26 to the rear freed end. Moreover, the operating portion 25 and the lock portion 26 are formed to bridge over the long hole 27 in a width direction.

Figure 3A:
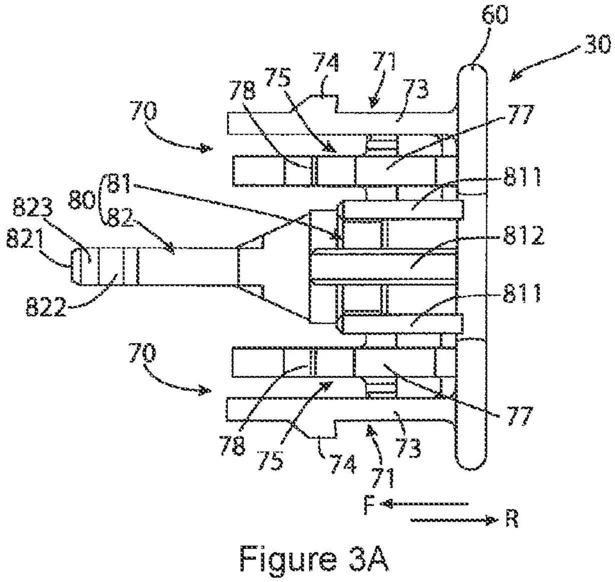
FIG. 3(A) is a top view of a CPA of the connector in accordance with an exemplary embodiment.
Figure 3B:
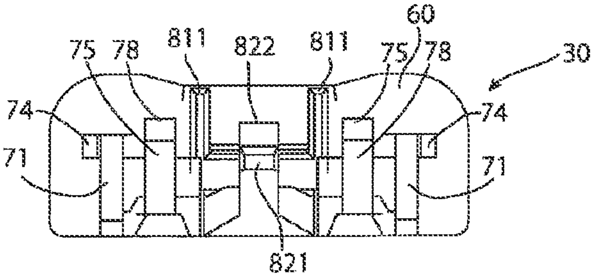
FIG. 3(B) is a front view of the CPA of the connector in accordance with an exemplary embodiment.
Figure 3C:
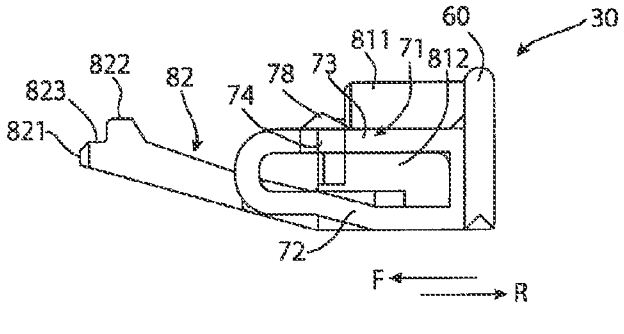
FIG. 3(C) is a side view of the CPA of the connector in accordance with an exemplary embodiment.

FIG. 3 illustrates three side views of the CPA. Note here that (A) of FIG. 3 is a top view, (B) of FIG. 3 is a front view, and (C) of FIG. 3 is a side view. The following describes a structure of the CPA with reference to FIGS. 1, 2, and 3.

The CPA 30 has a basal portion 60, a catch portion 70, and a beam portion 80.

The basal portion 60 is a portion that is operated by a user. Visual recognition of the position of the basal portion 60 allows the basal portion 60 to play a role as an index that indicates whether the CPA 30 is in the completely mated position. It is assured by the CPA 30 being in the completely mated position that the connector 10 and the mating connector 50 are in a completely mated state.

Further, the catch portion 70 is a portion having a plurality of arms.

A pair of right and left first elastic arms 71 are provide on both sides of the catch portion 70 in a width direction. Each of the first elastic arms 71 includes a first arm portion 72, a second arm portion 73, and a catch protrusion 74. The catch protrusion 74 is equivalent to an example of a first device-side catch portion.

The first arm 72 is connected to the basal portion 60 and extends forward from the basal portion 60 as indicated by the arrow F. Further, the second arm portion 73 is folded back upward at a leading end of the first arm portion 72, extends toward the basal portion 60, and is connected to the basal portion 60. Further, the catch protrusion 74 protrudes outward in the width direction from the second arm portion 73. As will be mentioned later, the catch protrusion 74 needs to interfere with the housing 20 so that the first elastic arm 71 warps. For this reason, the first elastic arm 71 needs the length to sufficiently warp. However, the length that the catch portion 70 is allowed to have in an F-R direction is too short. Therefore, in this example, a first arm portion 72 and a second arm portion 73 folded back at a leading end of the first arm portion 72 are formed to serve as a first elastic arm 71 having the length to sufficiently warp.

Note here that in the present embodiment, the first and second arm portions 72 and 73 of the first elastic arm 71 are arranged one above the other. In order to ensure the length to sufficiently warp, the first arm portion 72 and the second arm portion 73 may be arranged lateral to each other. However, when the first arm portion 72 and the second arm portion 73 may be arranged lateral to each other, the CPA 30 and the CPA retaining portion 23 of the housing increase in width. To address this problem, the present embodiment reduces increases in width by arranging the first arm portion 72 and the second arm portion 73 one above the other.

Further, the catch portion 70 is provided with a second elastic arm 75. In the case of this embodiment, two second elastic arms 75 are provided, and positioned in positions further inward than the pair of right and left first elastic arms 71 and separately adjacent to each of the first elastic arms 71. Each of the second elastic arms 75 includes a third arm portion 76, a fourth arm portion 77, and a protruding portion 78. The third arm portion 76 is connected to the basal portion 60 and extends forward from the basal portion 60 as indicated by the arrow F. Further, the fourth arm portion 77 is folded back upward at a leading end of the third arm portion 76, extends toward the basal portion 60, and is connected to the basal portion 60. Further, the protruding portion 78 protrudes upward from the fourth arm portion 77. The protruding portion 78 is equivalent to an example of a second device-side catch portion.

The second elastic arm 75 has a folded-back shape for the same reason as the first elastic arm 71. That is, the protruding portion 78 needs to interfere with the housing 20 so that the second elastic arm 75 warps. For this reason, the second elastic arm 75 needs the length to sufficiently warp. However, the length that the catch portion 70 is allowed to have in the F-R direction is too short. Therefore, in this example, a third arm portion 76 and a fourth arm portion 77 folded back at a leading end of the third arm portion 76 are formed to serve as a second elastic arm 75 having the length to sufficiently warp.

Further, the beam portion 80 has a base portion 81 and a stick-out portion 82. The base portion 81 includes right and left walls 811 and a center beam 812 so as not to warp together with the basal portion 60. The stick-out portion 82 extends forward and obliquely upward from a leading end of the base portion 81 in the form of a cantilever beam. The stick-out portion 82 is a portion that elastically warps as will be mentioned later. A protrusion 822 protruding upward is formed in a position slightly closer to the base portion 81 than a leading end 821 of the stick-out portion 82. Moreover, since the protrusion 822 is formed in a position slightly closer to the base portion 81 than the leading end 821, a step portion 823 is formed between the leading end 821 and the protrusion 822.

Figure 4A:
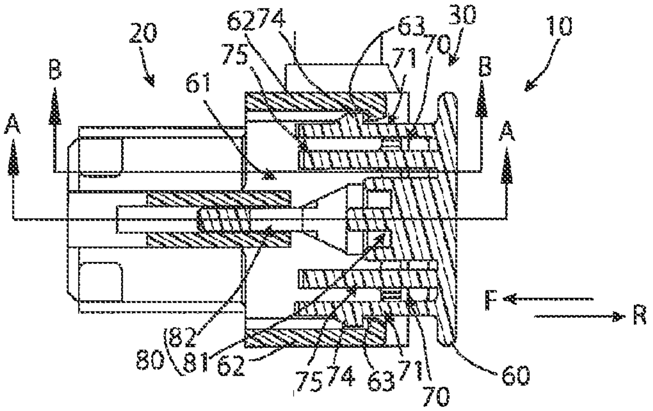
FIG. 4(A) is a cross sectional view of the connector with the CPA in an unmated position.
Figure 4B:
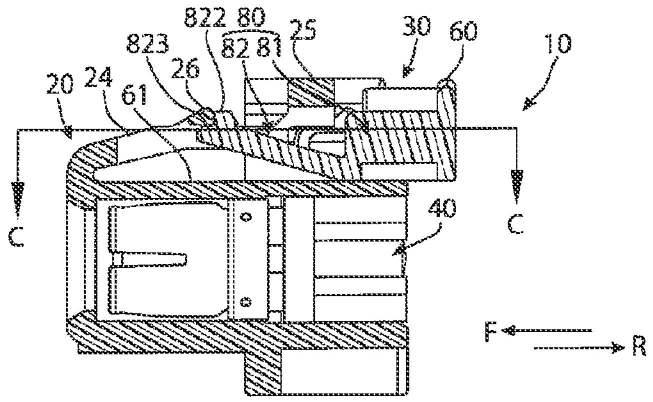
FIG. 4(B) is a cross sectional view of the connector with the CPA in an unmated position.
Figure 4C:
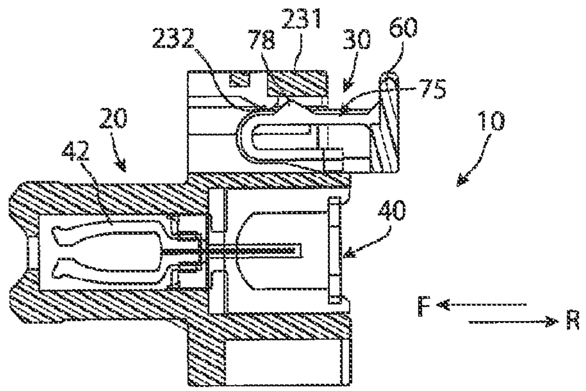
FIG. 4(C) is a cross sectional view of the connector with the CPA in an unmated position.

FIG. 4 is a cross sectional view of the connector with the CPA in the unmated position. Note here that (A) of FIG. 4 is a cross sectional view taken along arrow C-C in (B) of FIG. 4. Further, (B) of FIG. 4 is a cross sectional view taken along arrow A-A in (A) of FIG. 4. Furthermore, (C) of FIG. 4 is a cross sectional view taken along arrow B-B in (A) of FIG. 4.

The CPA 30 is mounted on the sliding surface 61 of the CPA retaining portion 23 of the housing 20. Further, standing walls 62 configured to guide the CPA 30 into a slide are formed on the right and left sides of the sliding surface 61 of the CPA retaining portion 23. Moreover, a catch projecting portion 63 projecting inward in the width direction is formed at a rear end portion of each of the standing walls 62.

In the process of attachment of the CPA 30 to the housing 20, the catch protrusions 74 formed on the first elastic arms 71 of the CPA 30 warp once by being pressed by the catch projecting portions 63 formed on the standing walls 62. Then, the catch protrusions 74 override the catch projecting portions 63, so that the right and left first elastic arms 71 become free from warpage as shown in (A) of FIG. 4. This position of the CPA 30 is the unmated position (which is an example of the first position).

Moreover, when the CPA 30 is in this unmated position, the protrusion 822 of the stick-out portion 82 of the CPA 30 is in contact with the lock portion 26 of the lock arm 24 of the housing 20 as shown in (B) of FIG. 4. Furthermore, as shown in (C) of FIG. 4, when the CPA 30 is in this unmated position, the protruding portions 78 formed on the second elastic arms 75 of the CPA 30 are facing the dropping portion 232.

When the CPA 30 is in this unmated position, the catch protrusions 74 and the catch projecting portions 63 prevent the CPA 30 from dropping out in the direction of the arrow R. Further, when the CPA 30 is in this unmated position, the CPA 30 is inhibited from sliding in the direction of the arrow F, as the protrusion 822 of the stick-out portion 82 is in contact with the lock portion 26 of the lock arm 24. Note, however, that the contact of the protrusion 822 with the lock portion 26 alone is not enough to inhibit the CPA 30 from sliding in the direction of the arrow F, as the stick-out portion 82 deforms when a strong force acts in the direction of the arrow F. To address this problem, the protruding portions 78 formed on the second elastic arms 75 of the CPA 30 are brought into contact with the dropping portion 232, whereby the prevention of a slide of the CPA 30 in the direction of the arrow F is assisted. It should be noted that the contact between the protruding portions 78 and the dropping portion 232 also plays a role of giving a sense of clicking when the CPA 30 slides in the direction of the arrow F into the completely mated position.

Figure 5A:
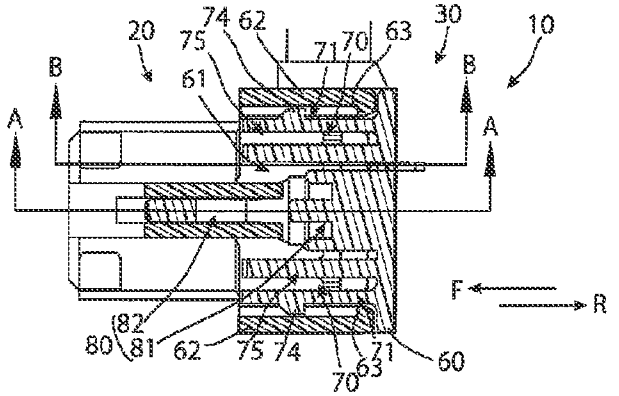
FIG. 5(A) is a cross sectional view of the connector with the CPA in a mated position.
Figure 5B:
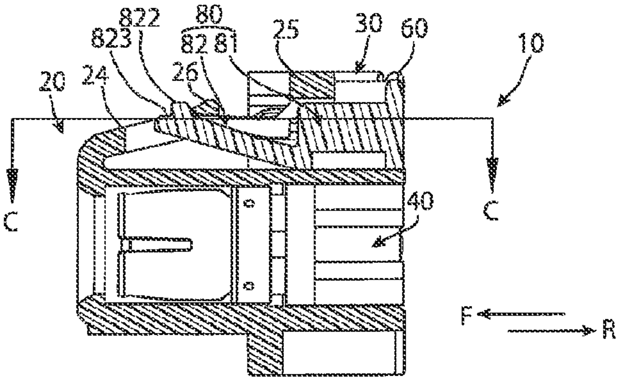
FIG. 5(B) is a cross sectional view of the connector with the CPA in a mated position.
Figure 5C:
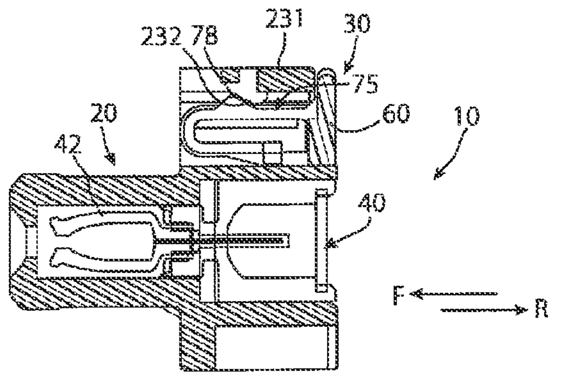
FIG. 5(C) is a cross sectional view of the connector with the CPA in a mated position.

FIG. 5 is a cross sectional view of the connector with the CPA in the completely mated position. Note here that (A) of FIG. 5 is a cross sectional view taken along arrow C-C in (B) of FIG. 5. Further, (B) of FIG. 5 is a cross sectional view taken along arrow A-A in (A) of FIG. 5. Furthermore, (C) of FIG. 5 is a cross sectional view taken along arrow B-B in (A) of FIG. 5.

When the CPA 30 is in the completely mated position, the basal portion 60 of the CPA 30 is in a state of being able to make contact with the rear ends of the standing walls 62 as shown in (A) of FIG. 5.

Further, when the CPA 30 is in the completely mated position, the protrusion 822 of the stick-out portion 82 of the CPA 30 is located further forward in the direction of the arrow F than the lock portion 26 of the lock arm 24 and is in contact with the lock portion 26 as shown in (B) of FIG. 5.

Further, similarly, when the CPA 30 is in the completely mated position, the protruding portions 78 of the second elastic arms 75 of the CPA 30 override the gate portion 231 of the CPA retaining portion 23 and are in a state of being in contact with the dropping portion 232 of the gate portion 231.

When the CPA 30 is in this completely mated position, the basal portion 60 of the CPA 30 comes into contact with the rear ends of the standing walls 62, whereby the CPA 30 is inhibited from sliding further in the direction of the arrow F.

Further, the contact of the protrusion 822 with the lock portion 26 and the contact of the protruding portions 78 with the dropping portion 232 inhibit the CPA 30 from sliding from the completely mated position into the unmated position.

The following describes how each member moves when the CPA slides from the unmated position into the completely mated position.

Figure 6A:
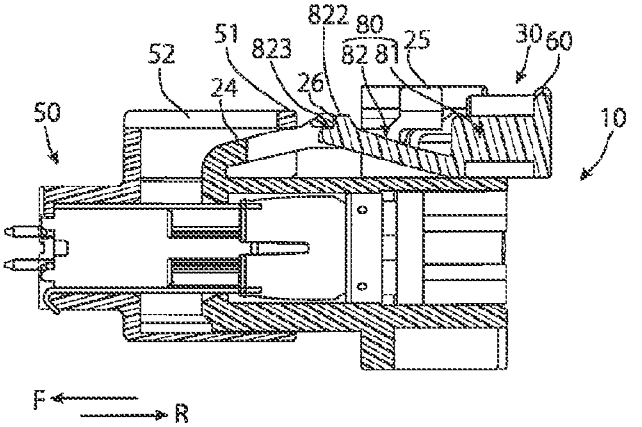
FIG. 6(A) is a cross sectional view of the connector showing the CPA in an unmated position.
Figure 6B:
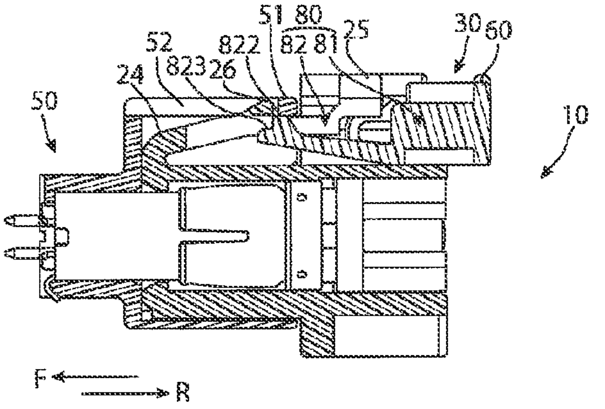
FIG. 6(B) is a cross sectional view of the connector showing the CPA in a partially position.
Figure 6C:
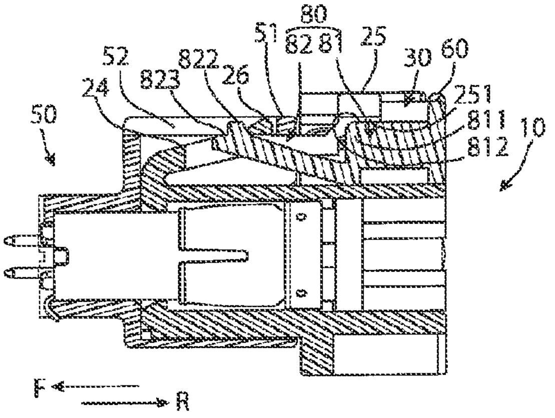
FIG. 6(C) is a cross sectional view of the connector showing the CPA in a mated position.

FIG. 6 is a cross sectional view showing a process by which the CPA slides from the unmated position into the completely mated position. Note here that (A) to (C) of FIG. 6 are cross sectional views taken along arrow A-A in (A) of FIG. 4 or (A) of FIG. 5. Note, however, that (A) to (C) of FIG. 6 also show a cross-section of the mating connector 50 as taken along arrow A-A. Note here that (A) of FIG. 6 shows the CPA 30 in the unmated position. Further, (B) of FIG. 6 shows a state in which the CPA 30 is still in the unmated position after the connector 10 and the mating connector 50 have been mated with each other. Furthermore, (C) of FIG. 6 shows the CPA 30 in the completely mated position. (A) to (C) of FIG. 6 show the connector 10 moving in the direction of the arrow F as the mating proceeds with the mating connector 50 at rest.

The mating connector 50 has a separating portion 51 provided at a leading end facing in the direction of the arrow R and a lock groove 52 formed immediately behind the separating portion 51.

Once the mating starts, the separating portion 51 of the mating connector 50 comes into contact with the lock arm 24, provided in the upper part of the housing 20 2 of the connector 10, which extends obliquely backward, as shown in (A) of FIG. 6. Then, when the mating further proceeds, the separating portion 51 presses down the lock arm 24 to cause the lock arm 24 to elastically warp. Then, the lock portion 26 of the lock arm 24 presses down the step portion 823 at the leading end of the stick-out portion 82 of the CPA 30, whereby the stick-out portion 82 is elastically pressed down, too. Moreover, at a final stage of the mating, the separating portion 51 passes over the lock portion 26 thus pressed down. When the separating portion 51 passes over the lock portion 26, the lock portion 26 and the separating portion 51 swaps their positions with each other in a front-back direction indicated by the arrows F-R as shown in (B) of FIG. 6. Although the connector 10 and the mating connector 50 are mated with each other at this stage, the CPA 30 is still in the unmated position. As noted above, the lock groove 52 is formed in a position adjacent to the separating portion 51 of the mating connector 50. For this reason, when the separating portion 51 passes over the lock portion 26, the lock arm 24 becomes free from elastic deformation, so that the lock portion 26 fits into the lock groove 52. This causes the connector 10 and the mating connector 50 to be completely mated with each other, and the engagement of the lock portion 26 and the lock groove 52 (separating portion 51) causes the connector 10 and the mating connector 50 to be locked into a completely mated state.

Note, however, that in the completely mated state shown in (B) of FIG. 6, the separating portion 51 is located above the protrusion 822 of the stick-out portion 82 of the CPA 30. For this reason, the stick-out portion 82 remains pressed down by the separating portion 51.

Next, the CPA 30 is pressed forward as indicated by the arrow F.

In the state shown in (B) of FIG. 6, the stick-out portion 82 remains pressed down by the separating portion 51. That is, the stick-out portion 82 is free from contact with the lock portion 26. Accordingly, at this stage, only the interference between the protruding portions 78 of the second elastic arms 75 of the CPA 30 and the dropping portion 232 of the gate portion 231 makes it difficult for the CPA 30 to slide forward (in the direction of the arrow F). Accordingly, pressing the basal portion 60 of the CPA 30 forward with such a strength as to overcome the interference between the protruding portions 78 and the dropping portion 232 causes the CPA 30 to slide into the completely mated position shown in (C) of FIG. 6, with a sense of clicking effected by the interference.

In this way, it is not until the connector 10 and the mating connector 50 are brought into the completely mated state that the CPA 30 can slide into the completely mated position. Once the CPA 30 slides into this completely mated position, the protrusion 822 of the stick-out portion 82 fits into a portion of the long hole 27 of the lock arm 24 that is in front of the lock portion 26, so that the protrusion 822 comes into contact with the lock portion 26. Further, once the CPA 30 slides into the completely mated position, the protruding portions 78 of the second elastic arms 75 of the CPA 30 become located in front of the dropping portion 232 of the gate portion 231 and interfere with the dropping portion 232. This contact and this interference inhibit an unintended slide of the CPA 30 from the completely mated position.

Further, when the CPA 30 is in the completely mated position, a lower surface 251 of the operating portion 25 of the lock arm 24 comes into contact with an upper surface 812 of a front end portion 811 of the base portion 81 of the CPA 30, whereby the operating portion 25 of the lock arm 24 is inhibited from being pressed down. That is, when the CPA 30 is in a state of having slid into the completely mated position, unintended disengagement of the lock portion 26 and the lock groove 52 (separating portion 51) is inhibited, so that the connector 10 and the mating connector 50 are kept locked in the completely mated state.

That is, it is assured by the CPA 30 being in the completely mated position that the connector 10 and the mating connector 50 are in the completely mated state.

It should be noted that the mating of the connector 10 and the mating connector 50 and a slide of the CPA 30 have been separately described here. Note, however, that in the case of the present embodiment, it is also possible to do the mating while pressing the basal portion 60 of the CPA 30 from a stage preceding the complete mating. In that case, pressing the basal portion 60 of the CPA 30 causes the mating to proceed, and the CPA 30 slides into the completely mated position immediately after the complete mating.

When the connector 10 and the mating connector 50 are brought out of the completely mated state into detachment, the CPA 30 is slid into the unmated position first by pulling the basal portion 60 of the CPA 30 backward (in the direction of the arrow R), so that the state shown in (B) of FIG. 6 is brought about. Next, the lock portion 26 and the lock groove 52 (separating portion 51) are unlocked by pressing down the operating portion 25 of the lock arm 24 of the housing 20 of the connector 10, for example, with a finger. This unlocking makes it possible to detach the connector 10 and the mating connector 50 from each other.

In this way, by providing the CPA 30 with the first and second elastic arms 71 and 75 shaped to protrude from the basal portion 60 and return to the basal portion 60, the connector 10 of the present embodiment achieves a CPA 30 and a connector 10 that are short in length in the front-back direction while ensuring warpage of the first and second elastic arms 71 and 75.

It should be noted that in the case of this connector 10, a pair of right and left first elastic arms 71 are needed, as it is necessary to guide the CPA 30 into a slide with right and left standing walls 62. Further, this connector 10 is provided with two second elastic arms 75, namely right and left second elastic arms 75. Note, however, that two second elastic arms 75 are not necessarily needed, but either a right or left second elastic arm 75 is sufficient. Alternatively, only one wide second elastic arm 75 may be provided in a space formed by slightly shifting the beam portion 80 either rightward or leftward. Furthermore, when the following three conditions are met, no second elastic arm 75 needs to be provided. That is, the first condition is that the strength of the stick-out portion 82 is sufficient and simply abutting of the protrusion 822 of the stick-out portion 82 against the lock portion 26 at the time when the CPA 30 is in the unmated position is sufficient. That is, the interference between the protruding portions 78 of the second elastic arms 75 and the dropping portion 232 of the gate portion 231 at the time when the CPA 30 is in the unmated position is unnecessary. Further, the second condition is that the engagement of the protrusion 822 of the stick-out portion 82 and the lock portion 26 at the time when the CPA 30 is in the completely mated position alone is sufficient. That is, the interference between the protruding portions 78 of the second elastic arms 75 and the dropping portion 232 of the gate portion 231 at the time when the CPA 30 is in the completely mated position is unnecessary, too. The third condition is that a sense of clicking effected when the CPA 30 slides from the unmated position into the completely mated position is unnecessary. When these conditions are met, no second elastic arm 75 needs to be provided.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A connector comprising:

a housing having a mating portion configured to be mated with a mating connector; and a connector position assurance device configured to slide between a first position on the housing and a second position further in front of the mating portion than the first position and, by being in the second position, assure that the connector position assurance device is in a state of being completely mated with the mating connector, the connector position assurance device includes a basal portion, and a pair of right and left first elastic arms, located on both sides of the connector position assurance device in a width direction intersecting a sliding direction of the connector position assurance device, each of which includes a first arm portion that is connected to the basal portion and that extends from the basal portion toward the mating portion, a second arm portion that is folded back at a leading end of the first arm portion, that extends toward the basal portion, and that is connected to the basal portion, and a first device-side catch portion that protrudes outward in the width direction;

wherein the housing includes a first housing-side catch portion configured to catch the first device-side catch portion.

2. The connector of claim 1, wherein the second arm portion is folded back at the leading end of the first arm portion so as to be located above or below the first arm portion.

3. The connector of claim 1, further comprising a second elastic arm including a third arm portion that is connected to the basal portion and that extends from the basal portion toward the mating portion, a fourth arm portion that is folded back upward at a leading end of the third arm portion, that extends toward the basal portion, and that is connected to the basal portion, and a second device-side catch portion that protrudes upward from the fourth arm portion, wherein the housing includes a second housing-side catch portion configured to catch the second device-side catch portion.

* * * * *